United States Patent [19]

Pagni et al.

[11] Patent Number: 5,790,755
[45] Date of Patent: Aug. 4, 1998

[54] FUZZY LOGIC ELECTRONIC CONTROLLER ARCHITECTURE HAVING TWO SECTION MEMBERSHIP FUNCTION MEMORY

[75] Inventors: Andrea Pagni; Rinaldo Poluzzi, both of Milan; Gianguido Rizzotto, Civate, all of Italy

[73] Assignee: SGS-Thomson Microelectronics S.r.l., Agrate Brianza, Italy

[21] Appl. No.: 282,280

[22] Filed: Jul. 28, 1994

[30] Foreign Application Priority Data

Jul. 29, 1993 [EP] European Pat. Off. ............... 93830337

[51] Int. Cl.$^6$ .................................................. G06F 9/44
[52] U.S. Cl. ........................................................ 395/3
[58] Field of Search ............................................ 395/3, 61

[56] References Cited

U.S. PATENT DOCUMENTS

| | | | |
|---|---|---|---|
| 5,084,754 | 1/1992 | Tomitaka | 348/363 |
| 5,179,629 | 1/1993 | Nakamura | 395/3 |
| 5,189,728 | 2/1993 | Yamakawa et al. | 395/51 |
| 5,239,620 | 8/1993 | Yamakawa et al. | 395/76 |
| 5,245,695 | 9/1993 | Basehore | 395/3 |
| 5,276,767 | 1/1994 | Nakamura | 395/3 |
| 5,335,314 | 8/1994 | Tsutsumi et al. | 395/3 |
| 5,347,615 | 9/1994 | Yamakawa et al. | 395/76 |
| 5,412,752 | 5/1995 | Basehore et al. | 395/3 |
| 5,495,558 | 2/1996 | Tashima | 395/61 X |
| 5,566,274 | 10/1996 | Ishida et al. | 395/61 |
| 5,574,826 | 11/1996 | Russo et al. | 395/3 |

FOREIGN PATENT DOCUMENTS

A-0471843  2/1992  European Pat. Off. .
A9222868  12/1992  WIPO .

OTHER PUBLICATIONS

A. Katsumata, et al, "Operation Method in Fuzzy Set Operation Processor," Proc. 1991 IEEE Int. Conf. on Computer Design, pp. 366–369.

H. Ikeda, et al, "A Fuzzy Inference Processor with an Active Rule–Driven Architecture", 1991 IEEE Symp. on VLSI Circuit, pp. 25–26.

Proceedings of the 1991 IEEE International Conference on Computer Design: VLSI in Computers & Processors (ICCD 1991), Oct. 14–16, 1991, Cambridge, MA, pp. 366–369, A. Katsumata, et al., "Operation Method In Fuzzy Set Operation Processor".

1991 Symposium on VLSI Circuits, Digest of Technical Papers, Oiso, Japan, May 30–Jun. 1, 1991, New York, USA, pp. 25–26, H. Idea, et al., "A Fuzzy Inference Processor with An 'Active–Rule–Driven' Architecture".

Patent Abstracts of Japan, vol. 16, No. 337 (P–1390) Jul. 22, 1992 & JP–A–04100153.

*Primary Examiner*—A. Katbab
*Attorney, Agent, or Firm*—Wolf, Greenfield & Sacks, P.C.

[57] ABSTRACT

A method for setting up the memories of an electronic controller operated in a fuzzy logic manner whereby membership functions ($\mu(x)$) of logic variables are subjected to inference operations which are configured as a set of (IF-THEN) rules, each having at least one fore (IF) preposition and at least one consequent (THEN) implication. The memories prearranged to store the data about a set of membership functions tied to the fore (IF) parts of the (IF-THEN) rules separately from the data associating each logic variable (X) with a corresponding one of the membership functions in said set.

5 Claims, 8 Drawing Sheets

FUZZY LOGIC ELECTRONIC CONTROLLER ARCHITECTURE HAVING TWO SECTION MEMBERSHIP FUNCTION MEMORY

BACKGROUND OF THE INVENTION

1. Field of the Invention

The present invention relates to an architecture of an electronic controller operated in a fuzzy logic manner, and to a method for setting up the memories associated with said controller.

In particular, the invention relates to an architecture of an electronic controller, and a method for setting up the memories associated therewith, being operated in a fuzzy logic manner, whereby predetermined membership functions ($\mu(x)$) of logic variables are subjected to inference operations configured as a set of rules (IF/THEN), each having at least one fore (IF) preposition and at least one consequent (THEN) implication, and being of a type which comprises an input section having at least one input terminal for signals related to physical control variables, a central control unit connected to said input section, and an output section connected to said central unit.

2. Discussion of the Related Art

The field of this invention is related to developments of artificial intelligence, and specifically to electronic data processing instruments based on a logic of the so-called fuzzy type.

The logic is asserting itself as a technique which can provide solutions to a comprehensive class of control problems, in relation to which traditional techniques have proved inadequate to yield solutions at an acceptable cost-to-performance ratio. A clearer understanding of the invention aspects calls for a brief discussion of the two principal methods of representing reality conventionally in use today.

The first method provides a numerical/analytical description of reality, and is widely employed for all those applications where all the terms of a given problem and the rules which govern the interactions between said terms can be identified in an accurate manner. However, that method is difficult to apply to all those instances where the aspects of the problem to be solved are difficult to identify, such as to the field of artificial intelligence. In such situations, a quantitative/qualitative description of reality has proved to be the most effective. Fuzzy logic provides a set of rules for dealing with problems which are wrapped in uncertainty and indefiniteness as is typical of most of human activities.

In other words, fuzzy logic provides a way of modelling the "indefinite" reasoning that is typical of human mind, a reasoning which plays, however, an essential role in human ability to make decisions under conditions of uncertainty. In particular, fuzzy logic operates on a linguistic description of reality using a particular class of variables called linguistic variables and generally denoted by the character X. The values of such variables may consist of words or phrases from any natural or artificial language, and used at the modelling stage of a given problem.

Each variable can be assigned a range of values which depend on it and may take different meanings according to the context where they are used.

Such values are obtained from a primary term which represents the variable, from an antonym thereof, and from a set of so-called modifiers of the primary term.

By way of example, assume that the noun or notion "Temperature" is taken to define the linguistic variable X, and that the word "cold" is selected as a primary term for the variable X and the word "warm" as its antonym.

To the primary term there may also be appended a set of so-called modifiers such as "not", "very", "more", "less", etc. (whence: not cold, very cold, colder, etc.) to complete the set of values associated with the linguistic variable X.

Each value assigned to a linguistic variable is represented, moreover, by a so-called fuzzy set, namely a possibilistic distribution function which ties each value of the variable to a so-called definition domain, also referred to as the "universe of discourse". The functions which define a fuzzy set in the universe of discourse of a variable are called membership functions $\mu(x)$, and it is through their intermediary that appropriate operations to define the fuzzy computation are carried out.

The aggregate of all the fuzzy sets of a linguistic variable is referred to as the term set.

By way of example only, shown in FIG. 1 of the drawings appended to this specification is a Cartesian coordinate graph representing diagramatically the notions set forth above.

In this drawing figure, plotted along the abscissa axis is the definition domain [x] of the linguistic variable X=Temperature, while along the ordinate axis, the degrees of membership are plotted, which may take any of the values within a range [0,1] of the functions $\mu(x)$ associated with the variable X.

For instance, the value $\mu(x)=0$ denotes non-membership of point x to the fuzzy set identified by the function $\mu$, whereas the value $\mu(x)=1$ positively denotes that the value x is a member of the fuzzy set.

Shown in the drawing figure are several membership functions which are tied to the set of values dependent on the linguistic variable X of choice: e.g., $\mu c(x)$ represents the membership function of the primary term "cold", $\mu h(x)$ that of the antonym "warm", $\mu nc(x)$ that of the modified term "not cold", and so on.

Such membership functions admit of two different types of representation: an analytical representation and a vectorial one.

The former type is represented by a function which enables a so-called mapping of the definition domain to be performed within the range of [0,1] through which the degrees of membership of the functions $\mu(x)$ may vary. The latter type consists, on the other hand, of a vectorial sample representation of the membership functions $\mu(x)$ as obtained by dividing the definition domain into N segments and the range [0,1] into L levels N Thus, a vector of components $\mu 1(x), \ldots \mu N(x)$ is created wherein each $\mu i(x)$ represents the closest level to the value of the function $\mu(x)$.

Logic operations, called inference operations, may be carried out among the membership functions which require electronic data processing equipment having a dedicated architecture for such operations.

Specifically, fuzzy logic, when analyzed at a high level, configures as a body of rules of the (IF/THEN) type applied to the membership functions $\mu(x)$ associated with a linguistic variable X, such that:

Rule

IF (A is A1) and (B is B1)

THEN (C is C1) and (D is D1)

where, A and B are the input values, A1 and B1 are membership functions $\mu(x)$ which represent the system knowledge at fuzzy level, and C1 and D1 are the output values.

The part of the rules which precedes THEN is called the "left-hand" or "IF" part, and the following one is called the "right-hand" or "THEN" part of the inference rules.

Among the applicable inference rules to the membership functions of the fuzzy variables, a so-called weight function $\alpha$ can be defined which provides an indication of how well the input values A and B, as converted to membership functions, match the membership functions A1 and B1 stored in the system memory. In relation to the above inference rule, for example, the weight function $\alpha$, indicating how well the input value A and the membership function A1 match each other, shows to be $\alpha(1A)=\max(\min(A,A1))$ while the weight function $\alpha$, indicating how well the input value B and the membership function B1 match each other, is $\alpha(1B)=\max(\min(B,B1))$.

With physical quantity control machines which convert physical values from external sensors to fuzzy variables, the computation of the weight functions $\alpha$ can be greatly simplified.

In that case, in fact, the representation of the input variables to the fuzzy system is performed by converting such variables to "crisp" membership functions, i.e. µ functions having a degree of membership equal to 1("true") at the corresponding point to the input value and 0("false") elsewhere.

Thus, the computation of the weights $\alpha$, in the particular instance of input values being represented as crisp membership functions, thins down to finding the intersection point of the input variable with the membership functions that make up a given term set.

Another meaningful weight function is defined as $\Omega=\min(\alpha iA,\alpha iB,\ldots)$ which indicates how well the (IF) part of an inference rule is "generally alike".

To compress the number of the fuzzy rules, a connective "or" in the "left-hand" part of such rules is often used, for example, to merge two rules into one.

This is useful to reduce the accesses to memory in performing an inference operation.

To take into account the presence of such connectives of the "or" type in the computational model shown herein, one ought to consider an operator $\theta=\max(\Omega i1,\Omega i2,\Omega i3,\ldots)$.

The operator $\theta$ is used to modify the membership functions belonging to the "right-hand" part of the rules and is brought to play by applying the inferential methods MAX-MIN or MAX-DOT, both well known from the pertinent literature.

The former of said methods acts to truncate, at the value of the operator $\theta$, the membership functions belonging to the "right-hand" part of the rules, whereas the latter modifies such functions, according to the value of $\theta$, so as to squeeze them from their original form.

The choice of such methods is tied to the type of the representation which is adopted for the fuzzy sets.

Basically, the MAX-MIN method is used where a vectorial representation of the membership functions is adopted, the MAX-DOT method being preferred where an analytical representation of said functions is adopted.

A dedicated fuzzy computation instrument can currently be provided using either of two different technologies: a so-called hybrid technology, that is an analog/digital one, or an expressedly digital technology.

The choice of one technology in preference of the other markedly affects the type of the representations whereby the membership functions can be formalized. 8

In essence, by selecting the hybrid technology, the membership functions can only be represented in a vectorial manner, wherein the vector components are values of voltages and/or currents which represent so-called levels of truth.

This technology has been developed by the Fuzzy Logic System Institute headed by Prof. Yamakawa and is described, for example, by M. M. Gupta & T. Yamakawa in "Intrinsic Fuzzy Electronic Circuits for Sixth Generation Computers", 1988.

The digital technology, on the other hand, allows the membership functions to be represented both in the vectorial form and in the analytical form.

The analytical representation allows two formalization methods, of which a first consists of providing but a few outstanding points of a function to enable mapping of the definition domain of the membership functions within the range [0,1] of change of the degrees of membership associated with such functions.

As outstanding points, those where the function changes its gradient pattern are used.

The fuzzy device is assigned the duty of joining such points together in order to proceed with the fuzzy computation proper.

An example of such a device is a machine designated FP-3000 by OMRON Corporation, which comes with an Operation Manual entitled "Digital Fuzzy Processor-Controller Series".

Among the advantages of this approach is the high precision with which the membership domain of the various µ functions can be segmented both in the horizontal plane and the vertical one.

However, there are some disadvantages connected with the poor flexibility with which the membership functions can be described.

The second formalization method of the analytical approach consists of providing equations which describe the membership functions within their domain.

In this case, improved flexibility can be obtained in the definition of such functions.

However, with either analytical methods, the fuzzy computation is carried out using a purely numerical approach, which burdens the computation.

To come to the digital technology that utilizes the vectorial representation of the membership functions, it distinguishes itself mainly by that the representation along the vertical axis of a given level of truth involves of necessity the use of a number of bits dependent on the degree of accuracy sought.

Among the advantages of this technology is definitely the high computational simplicity afforded to the performance of the fuzzy inferences. An example of such an embodiment is described by H. Watanabe in an article "A VLSI Fuzzy Logic Controller with Reconfigurable, Cascadable Architecture", IEEE Journal of Solid-State Circuits, Vol. 25, No. 2, April, 1990.

SUMMARY OF THE INVENTION

The present invention relates to a novel architecture of an electronic controller within the frame of the last-mentioned technology.

The underlying technical problem of the present invention is to provide an architecture of an electronic controller which has such structural and functional features as to allow the computational aspects of fuzzy logic to be handled in considerably less time and through streamlined operations, thereby overcoming the drawbacks with which prior approaches are beset.

It is the object of the present invention to so set up the memories associated with the controller as to greatly reduce the storage area devoted to storing the membership functions from the IF parts of the fuzzy rules and the computation work for the THEN parts of the rules.

A unique input section for a fuzzy logic electronic controller according to the present invention consists of a two part membership function memory. General membership function shapes are stored in the first part of the membership function memory; the second part of the memory stores data relating each logic variable to one of the membership function shapes. The data in the second part of the memory includes the corresponding membership function shape and any offsets.

Upon receipt of a logic variable value, an address decoder in the input section accesses the second part of the memory to determine the appropriate membership function data. A second address decoder accesses the membership function in the first part of the memory. The architecture of the input section further determines the membership function value from the input variable and the data retrieved from the memory.

The input section is connected to a fuzzy engine for performing fuzzy inferences using the membership function values from the input section. A defuzzifier generates appropriate outputs for controlling a process from the fuzzy engine results.

The features and advantages of an architecture according to the invention will become apparent from the following description of an embodiment thereof, given by way of example and not of limitation with reference to the accompanying drawings.

DETAILED DESCRIPTION

The Figures of the accompanying drawings generally and schematically illustrate an electronic controller 1 architecture embodying this invention.

Figure 1:
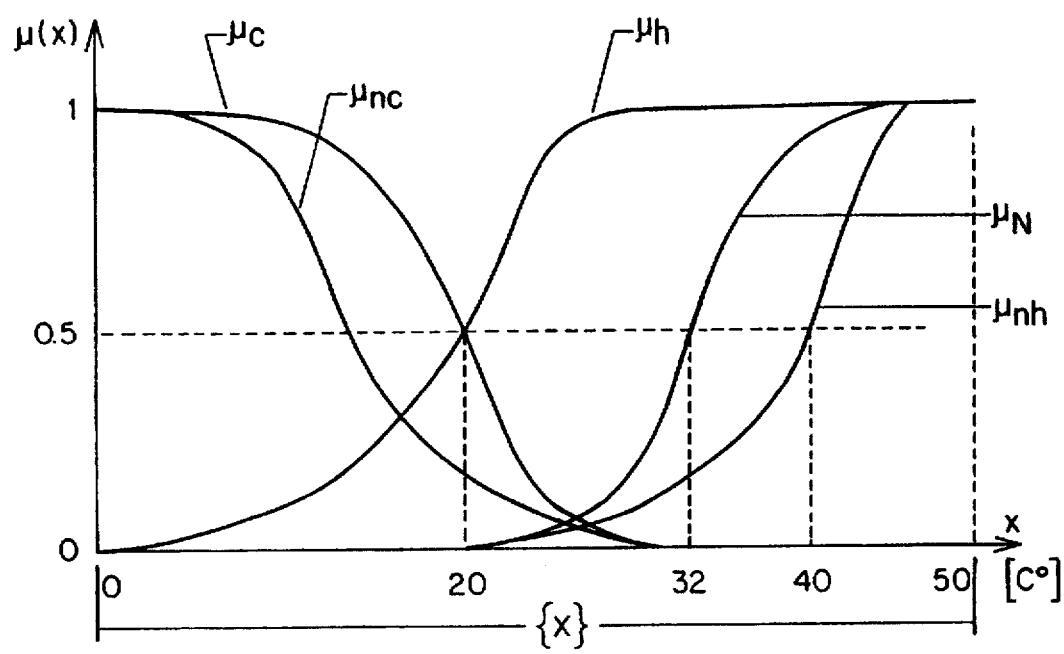
FIG. 1 shows a graph reproducing examples of membership functions of logic variables of the fuzzy type.
Figure 2:
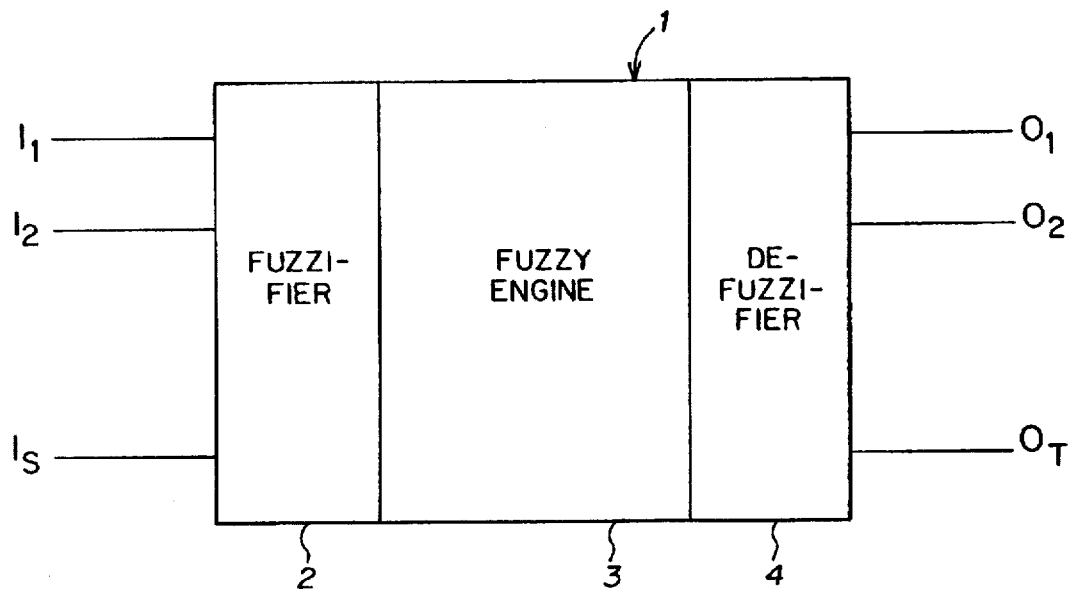
FIG. 2 is a diagramatic view of an architecture according to the invention.

The architectural scheme shown in FIG. 2 comprises three interconnected blocks 2, 3 and 4, respectively representing a fuzzifier, fuzzy engine, and defuzzifier.

The fuzzy engine 3 and defuzzifier 4 may be implemented conventionally as disclosed, for example, in European Patent Applications Nos. 92830604.2 and 92830095.3 by this Applicant. The controller 1, as shown in FIG. 2, is designed to operate in a fuzzy logic manner, which means that the controller is a machine provided with plural inputs S adapted to receive signals related to physical control variables from outside, which machine can perform certain so-called inference operations in the fuzzy logic, and output control signals.

Figure 3:
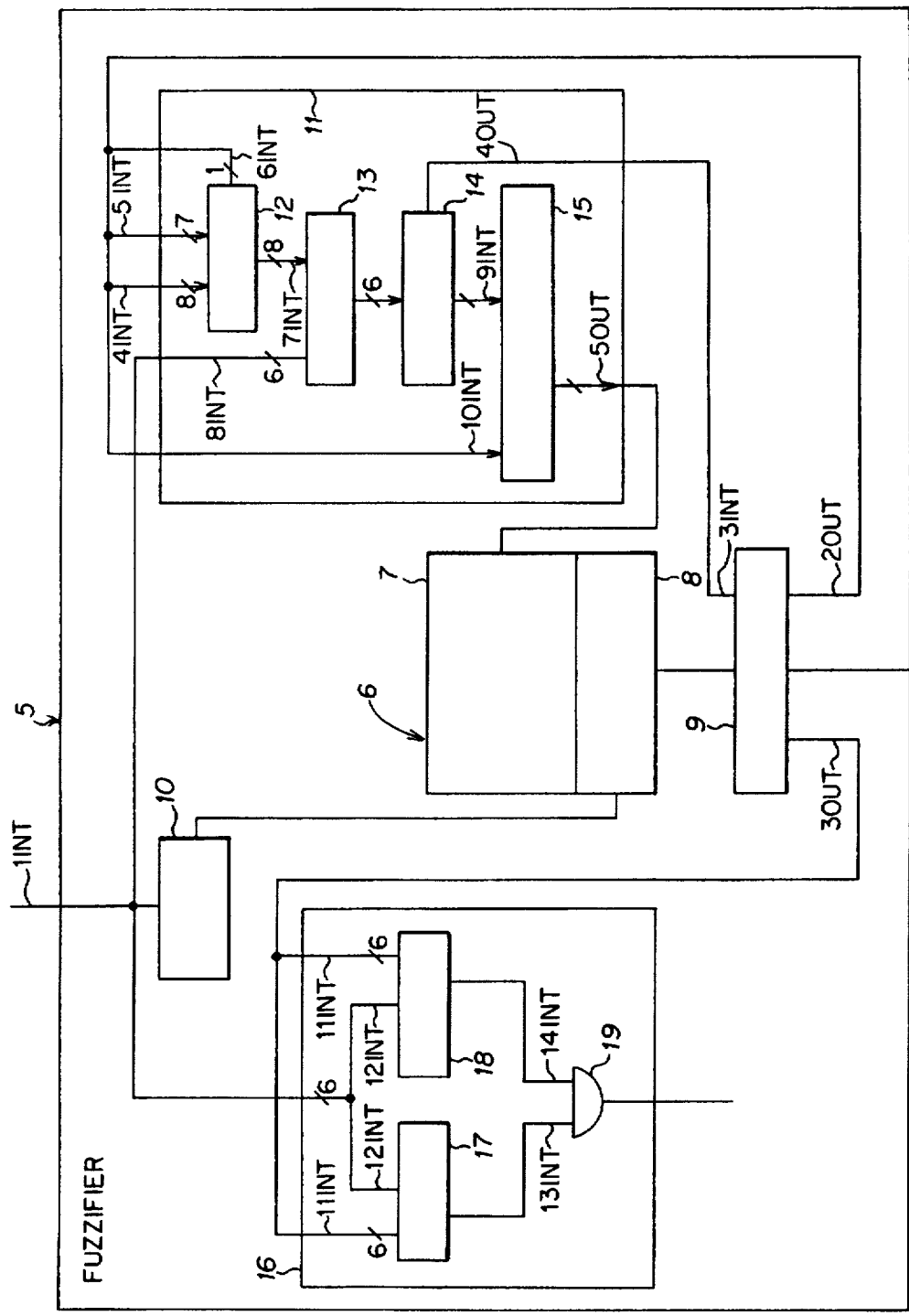
FIG. 3 shows diagramatically an input section of the architecture in FIG. 2.

In a preferred embodiment, the controller 1 has a single input led to a converting block (fuzzifier) 5, shown in FIG. 3, which forms the input section 2, of said controller 1.

This section may also include several blocks 5, each connected to one controller input, according to specific requirements of interfacing with the outside world.

The converting block 5 is effective to convert an input signal to logic information of the fuzzy type, that is to a so-called membership function $\mu(x)$, and to compute weight functions, denoted by $\alpha$, representing the intersection of said membership function with the fuzzy knowledge base stored in the controller 1 memories.

The controller further comprises a central control unit (fuzzy engine) 3, wherein operators, denoted by $\theta$ are computed which relate to each of the so-called (IF-THEN) rules of the fuzzy logic.

Such operators are then used to modify the membership functions related to the so-called consequent (THEN) parts of the fuzzy rules.

Also computed within the central unit 3 are the addresses of a memory block 22 (FIG. 4) storing data about the membership functions tied to the consequent parts of the fuzzy rules.

The controller 1 architecture is completed by an output section (defuzzifier) 4, for conversion and driving external apparatus.

In this respect, the controller is provided with a number T of control outputs.

In a preferred embodiment, the value of T is 1.

The internal construction of the converting block 5 will now be described in greater detail.

With reference to FIG. 3, it can be seen that the converting block 5 comprises a memory block 6 devoted to storing data related to the membership functions tied to the fore (IF) parts of the fuzzy rules.

It should be noted that the controller 1 architecture involved in the computation of (IF) parts has been defined with the assumption that a discrete vectorial representation of the membership functions $\mu(x)$ can be provided.

The definition domain x1, . . . ,xN of the so-called logic variables of the fuzzy type, denoted by X, has been divided into a number N=64 of segments, each adapted to take a value from a set [1,2, . . . ,L], where L=16 representing a degree of membership between two limits of truth level 0=false and 1=true.

This non-limitative choice of the values for N and L has been suggested by the need to reconcile contrasting requirements in terms of accuracy of data representation and computational efficiency, understood both as the number of electronic component parts involved and the time required to perform an inference operation.

The memory 6, which may be any read-only type (EPROM, EEPROM, . . . ) directly programmable by the user, is represented physically by a single block split into two areas: an area called the "imaging" area 7 and an area called the "activating" area 8. The imaging area 7 contains an aggregate of membership functions tied to the (IF) prepositions only in the set of (IF-THEN) rules, while the activating area 8 contains the data which associate each of the logic variables of the fuzzy type participating in the control process with a corresponding one of the membership functions in said aggregate. Specifically, it has been found that many membership functions µ(x), while having a different location in the definition domain of a fuzzy variable associated therewith, when suitably shifted, are identical, i.e. their respective non-zero components µi(x) match 1 to 1 when the indices are neglected.

This phenomenon is specific to the membership functions of one term set.

Figure 6:
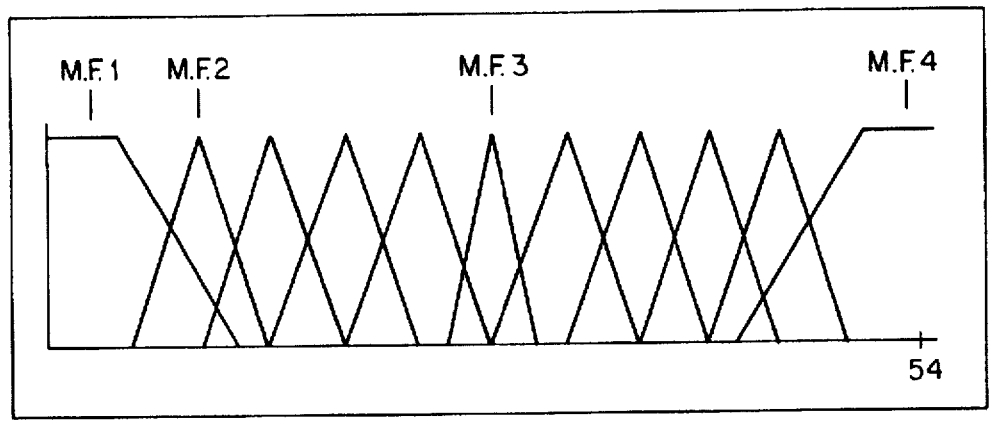
FIG. 6 shows a graph representing membership functions as are contained in one and the same term set associated with a logic variable of the fuzzy type.

With reference to FIG. 6, for example, for a dozen membership functions forming a term set, the membership functions with different forms prove in general to be four.

It can be inferred from the above that if one proceeds to store in the imaging area 7 a sample set of membership functions —an operation referred to as "imaging"— comprising four such functions in the above example, rather than to store all the membership functions of each term set, then the memory occupation could be significantly reduced.

Further, of such "imaging" functions, only that range is used wherein the non-zero condition µi(x) has occurred, which affords additional memory savings.

In view of the foregoing, for a better understanding of the importance of the type of memory 6 setup proposed by the invention, a clarification should be made.

Considering a term set made up of an aggregate of membership functions µ(x), using a conventional method, the information would be stored by writing in the level of truth of each point of each membership function, and the functions would be allocated contiguous spaces.

The memory setting up method of this invention works in a clearly different manner.

In fact, the information about the membership functions are stored in the imaging area 7 as the largest number of non-zero components µi(x) from all the components that represent such functions.

Preferably, the number of non-zero components or samples µi(x) to be stored is selected to equal 32 because this enables a large number of term sets, comprising a small number of different membership functions, to be characterized.

Figure 7:
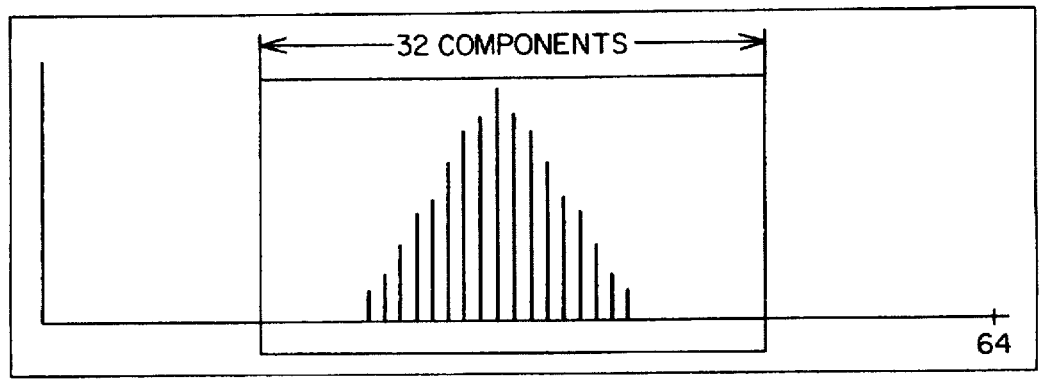
FIG. 7 shows a graph representing a set of components of membership functions stored in one of the memories incorporated to the architecture in FIG. 2.

Such components, moreover, are stored to adjacent memory locations, and 4 bits are used for storing each of the components. With reference to FIG. 7, the values of the "imaging" membership functions actually stored in are those included within the highlighting rectangle.

The activating area 8 contains 32-bit words whereby the fuzzy variables of the control process are associated with a corresponding "imaging" membership function.

Figure 8:
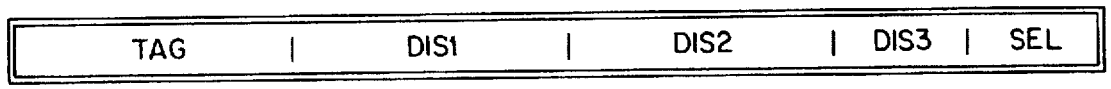
FIG. 8 is a diagramatic view of the setup for the words contained in one of the memories incorporated to the architecture in FIG. 2.

Such words are set up as indicated diagramatically in FIG. 8, where the TAG value, stored as 8 bits, represents the address in the imaging area 7 where the first sample of the "imaging" membership function associated with the fuzzy variable under consideration is contained.

Figure 9:
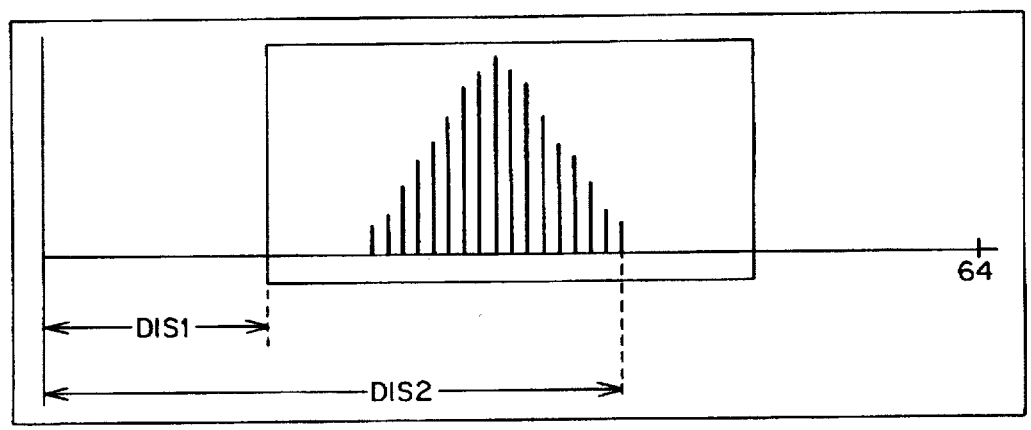
FIGS. 9 and 10 show graphs representing some particular values stored to the memory words shown in FIG. 8.
Figure 10:
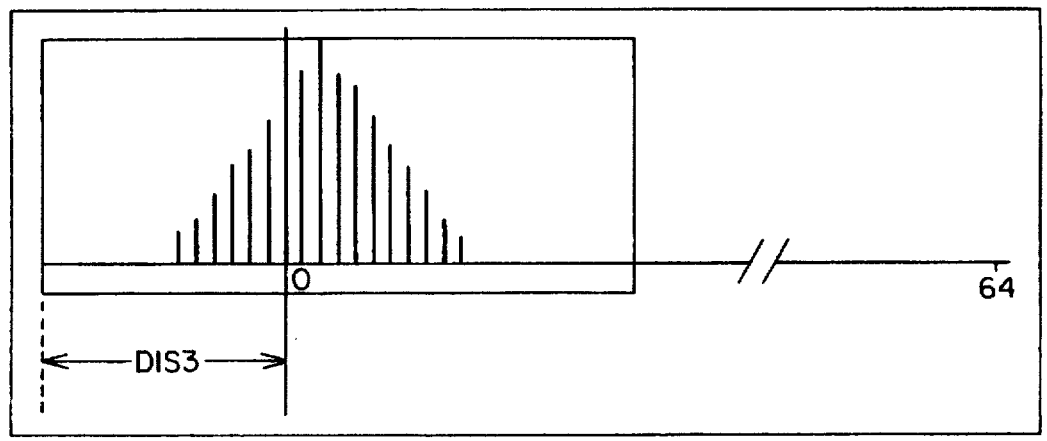

With reference to FIGS. 9 and 10, the DIS1 value, stored in 8 bits, gives the distance from the origin of that membership function which actually corresponds to the fuzzy variable under consideration, that is, it specifies how far should the "imaging" membership function be shifted to obtain the actual membership function.

The DIS2 value, stored in 8 bits, indicates the last value of the membership function actually corresponding to the fuzzy variable considered, which value may be other than zero, while the DIS3 value, stored in 7 bits, also allows membership functions to be handled which locate at the left-hand end of the definition domain of the fuzzy variable considered, that is, functions µ(x) whose meaningful area is shifted from the origin.

The SEL value, stored in a single bit, indicates whether a non-zero value is present in DIS3.

It should be emphasized, moreover, that one and the same "imaging" membership function may be associated with membership functions related to different variables, thereby lowering even more the data storage space requirements.

Connected to the memory 6 is a decoder block 10 devoted to computing the address of the memory word contained in the activating area 8 where the TAG, DIS1, DIS2, DIS3 and SEL values related to the fuzzy variables under consideration are stored.

To have the above computation carried out quickly, the decoder block 10 is embodied by an arithmetic-logic unit or another equivalent circuit.

This circuit is also provided with at least one input terminal 1INT adapted to receive signals related to physical control variables from outside.

Said input is coincident with the input of the controller 1 and the converting block 5.

It should be noted that the number of the terminals which make up the output of the decoder block 10 will depend on the size of the memory 6.

The memory 6 is also connected, through a shift register 9, to an enable block 16 and a second decoder block 11 for decoding the address of the words contained within the imaging area 7.

The shift register 9 can suitably supply the enable block 16 and the second decoder block 11 with data contained in the "activating" area 8 selected by the decoder block 10 after it is input the signal about the control variable from outside.

Specifically, the enable block is formed by two comparators 17, 18 in parallel and a logic AND gate 19 having a first input terminal 13INT connected to the comparator 17 and a second input terminal 14INT connected to the comparator 18.

The enable block 16 functions to indicate whether the intersection of the value of the input signal with the membership functions stored in the memory is likely to be other than 0.

To this aim, the value I of the input signal and value DIS1 contained in the word in the "activating" area 8 selected by the decoder block 10, and the value I of the input signal and value DIS2 contained in the word in the "activating" area 8 selected by the decoder block 10 are simultaneously supplied to the input of the comparator 17 and the input of the comparator 18, respectively.

The two comparators will ascertain the following conditions in parallel:

I>=DIS1 and I<=DIS2

It is only when both conditions are verified that the intersection of the input value with the membership function with which the DIS1 and DIS2 values are associated is likely to be other than 0.

If this intersection is non-zero when outgoing from the AND gate 19, a signal will be issued to supply this vital information to the control parts. If the intersection is non-zero, the second decoder block 11, additionally to computing the address in the "imaging" area of the memory word which contains the corresponding sample, stored in four bits, to the input signal, computes through how many samples, also stored in four 4 bits, should the word in the "imaging" area by shifted to yield the corresponding sample to the input.

To have such operations carried out effectively, the second decoder block 11 includes a two-way multiplexer driven by the SEL signal, whose value is contained in the word of the "activating" area 8 selected by the decoder block 10.

Two signals appear at the input of this multiplexer which contain the values of DIS1 and DIS3, on which the multiplexer will perform a selection.

The SEL signal is set during the storing phase of the membership functions, and indicates whether a non-zero value is present in DIS3.

In fact, the presence of a non-zero value in DIS3 would indicate the existence of a "degenerate" situation, that is the presence of a membership function located at the left-hand limit of the definition domain of the fuzzy variable considered.

The output value from the multiplexer is designated DIS.

Using a subtractor 13 connected to the multiplexer, the operation (I-DIS), where I is the value of the input signal ingoing directly to the subtractor 13 through the terminal 8INT, is then performed.

The output value from the subtractor 13, designated PAR, indicates which of the 32 values stored in the "imaging" area 7 corresponds to the input signal.

Connected to the subtractor 13 is a divider 14 which performs an integer division of the PAR value by 8.

The last-mentioned value is the outcome of the decision made to use 32-bit memory words, each word containing, therefore, 8 samples and each sample being stored in four bits. The result of the integer division of PAR by 8 yields a value, designated SPI, which is the displacement of the memory word containing the sample sought relative to the base address, represented by the TAG value, of the word in the "imaging" area 7 where the first sample of the membership function containing the input sample is contained.

The remaining part of the integer division yields a value, designated SHIFT, indicating how far the memory word containing the sample sought should be shifted to actually obtain that sample.

The SHIFT value is input to the shift register 9 which, based on this value, will shift as appropriate the word in the "imaging" area selected by the second decoder block 11.

Connected to the divider 14 is an adder 15 which provides the sum of the SPI value, as input thereto from said divider, plus the TAG value ingoing directly to the adder through the input 10INT.

The TAG value is contained in the word of the "activating" area 8 selected by the decoder block 10.

Output from the adder 15 is the address of the word in the "imaging" area 7 where the sample sought is contained.

Thus, the output 1OUT from the shift register 9, which coincides with the output from the converting block 5, will provide the samples representing the intersection of the input value with the stored membership function.

Figure 4:
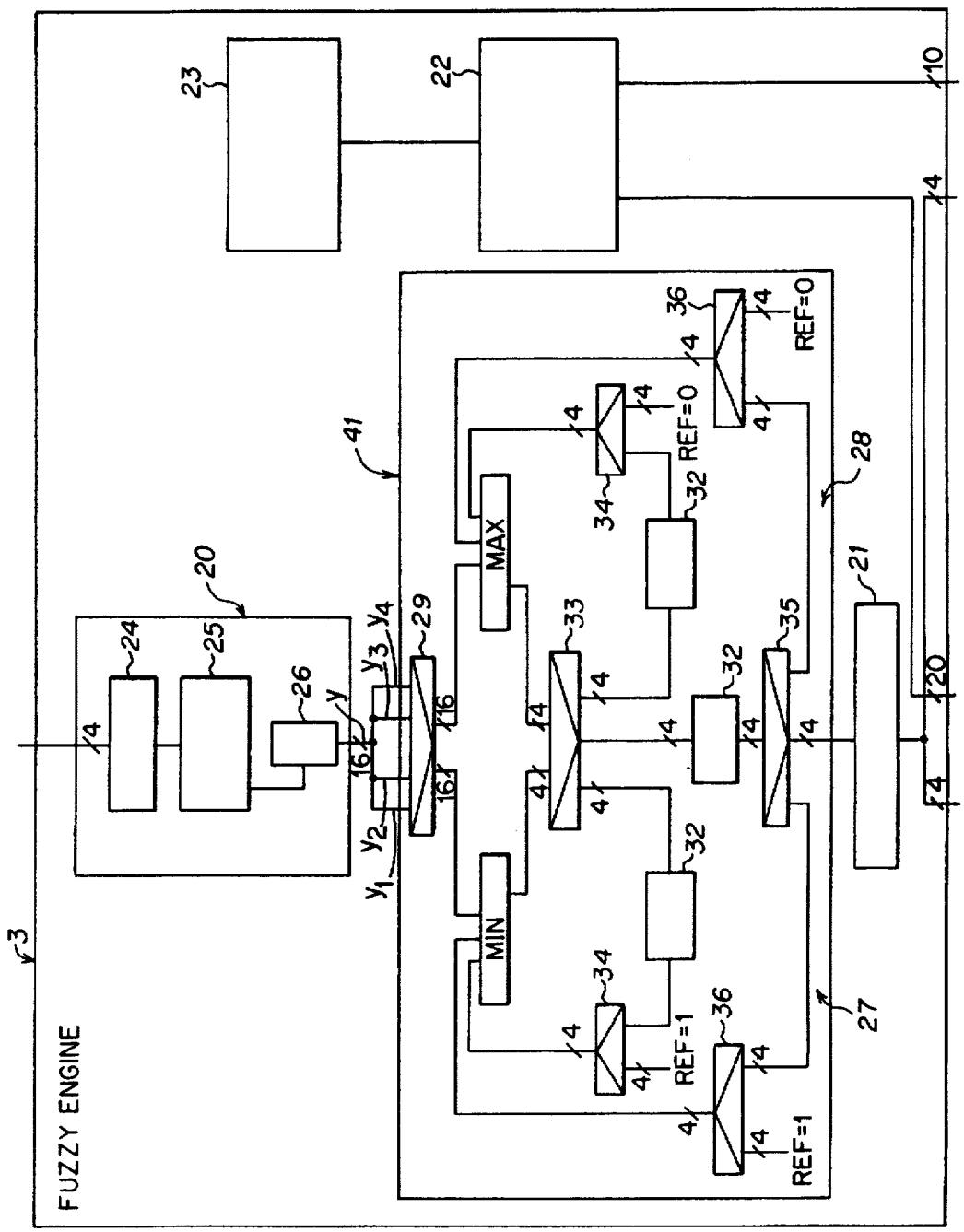
FIG. 4 shows diagramatically a central control unit incorporated to the architecture in FIG. 2.

With reference to FIG. 4, the central unit 3 of the controller 1 comprises an interfacing block 20 operative to manage as appropriate the information from the converting block 5 and pass it to a selector block 19 devoted to computing the operator θ of a given inference rule once the values of μi associated with the fore part of that rule are known.

The presence of the block 20 is necessary because it allows the number of membership functions per term set to be diversified.

In other words, a dynamic allocation of the memory is provided since, in this way, the values of α tied to the membership functions for the (IF) parts of the rules can be loaded to memory locations which depend, of course, on the characteristics of the membership functions and their number.

The functions α from the converting block 5 cannot be sent directly to the computational elements of the controller 1.

To this aim, and with reference to FIG. 4, the interfacing block 20 comprises a buffer register 24 having an input terminal connected to the output terminal 1OUT of the converting block 5 and an output terminal connected to the input terminal of a finite state machine 25 or an equivalent machine whereby the values of the weight functions α from the converting block 5, are stored into a read/write memory 26 of the RAM type for subsequent use in computing the weight θ associated with the various fuzzy rules.

The size of the memory 26 is a function of the largest number of membership functions that may be present in a term set.

A sixteen-bit bus lead y—connected to at least four leads y1, y2, y3, y4, each being a four-bit one, which form the selector 19 inputs—is led out of the memory 26.

The architecture of this selector 19 is illustrated in detail in FIG. 4 and comprises two symmetrical portions 27, 28 intended for computing prepositions having logic OR and AND operands, respectively. Said selector 19 is input the values of α related to a given rule, and is adapted to manage rules which have any selected number of prepositions in their premises (IF parts).

Figure 11:
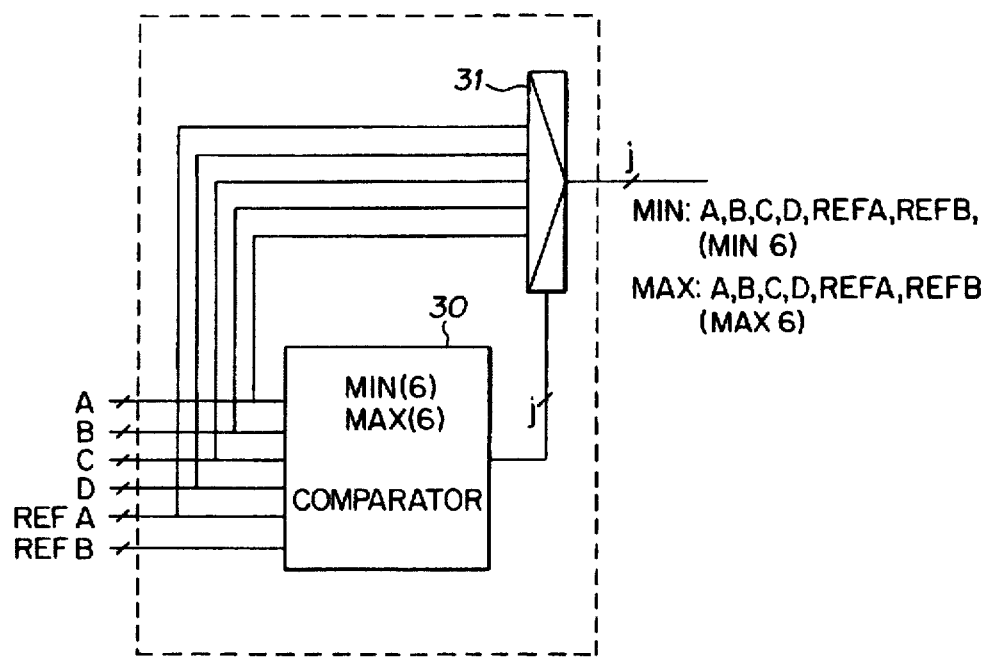
FIG. 11 is a diagramatic view of some details of the central control unit in FIG. 4.

According to the types of the logic operands contained in the rule, the values of α are sent into MIN or MAX blocks through a multiplexer 29. The structure of the individual MIN or MAX block is shown in FIG. 11 and includes α comparator 30 having a plurality of inputs which receive the values of α, and one output only at which the minimum, or maximum, value of the input values is presented. The output from the comparator 30 is addressed to a multiplexer 31 whereto the signals at the comparator input are also suitably rerouted.

The great simplicity of this computational approach results from that only simple operations of quantity comparison are performed.

This affords great savings both in computation time and electronic components.

The incorporation of a few buffer registers 32 to the selector 19 provides a local memory for the feedback performance of computational operations using the partial results from the previous operations.

Each of the portions 27, 28 comprises a feedback loop whereby the output from each MIN or MAX block is input back to that same block via a multiplexer 33, a register 32, and a second multiplexer 34.

A second feedback loop, which may be regarded as external of the first, takes the output from the multiplexer 33 back to an input of both the MIN block and the MAX block through a register 32 and two cascaded multiplexers 35, 36.

The provision of two feedback loops per MIN and MAX functional block allows the weight function Ω of a rule to be computed which indicates how "generally alike" is the (IF) part of said rule, even where this weight function is a complex one, in accordance with a strategy which minimizes the processing time.

The order in which the operations are performed and the nature of the weights α are defined within a machine control "microcode", and become known upon compiling the fuzzy rules which represent the control program.

The various multiplexers incorporated into the selector 19 are operated by the control signals themselves and either supply meaningful data (contents of the registers) or meaningless ones (zero when sent to the computation block for maximum, one when sent to the computation block for minimum), according to whether the operation to be performed requires the data stored in the registers.

The selector output, specifically the multiplexer 35 output, carries the value of θ associated with the IF part of a rule and resulting from an appropriate combination of various weight functions α taken in a predetermined order.

This value of θ represents the level of truth of that rule and is used to obtain the required terms for the defuzzifying process.

The value of θ is passed to a second interfacing block 21 comprising a simple register or an equivalent structure through which the defuzzifier section 4 can simultaneously be supplied the value of θ outgoing from the selector 19 and the data related to the membership functions associated with the consequent part of the fuzzy rules, which are stored into a block 22 formed by a single logic memory block.

Let us review now the method for storing the membership functions related to the consequent part of the fuzzy rules.

The data are stored in a different way from the membership functions related to the IF part of the rules, both on account of the different nature of such data and in order to foster efficient processing of same.

While it was important in the previous instance that the values of α for each variable could be accessed at one time, in this case it matters that the data be efficiently supplied to the output and converting section 4 on which the next fuzzy rule computations would be carried out.

To carry out so-called defuzzifying operations on the membership functions related to the consequent part of the rules, it is sufficient that scant, but meaningful, information be available, namely: a value related to a so-called center of gravity Cg for each membership function—a weight associated with each value of θ in that function.

Advantageously, the center of gravity can be calculated as the ratio of two summations carried out in parallel which relate to the numerator and denominator terms, respectively, of said ratio.

Stored into each memory word of the block 22 are both the numerator term and the denominator term, which are associated with the same value of θ.

In this way, both data can be read with a single access to memory.

Specifically, a memory word in the block 22 has a number q of bits which is given by the sum of those used to represent the addend in the numerator plus that in the denominator of the above-mentioned ratio.

In general, the number of bits required to represent such terms will be a function of the horizontal resolution (definition domain) N and the vertical resolution (levels of truth) L.

Preferably, 20 bits are used to represent the numerator term and 10 bits to represent the denominator term.

Thus, one memory word having a 32-bit spread will suffice for each membership function related to the consequent part of the fuzzy rules. The number of words contained in the memory 22 is, instead, dependent on the type of the inferential process that is to be applied to the consequential membership functions.

The central control unit 3 further comprises a block 23 which functions to compute the address of each of the memory words contained in the block 22.

Figure 5:
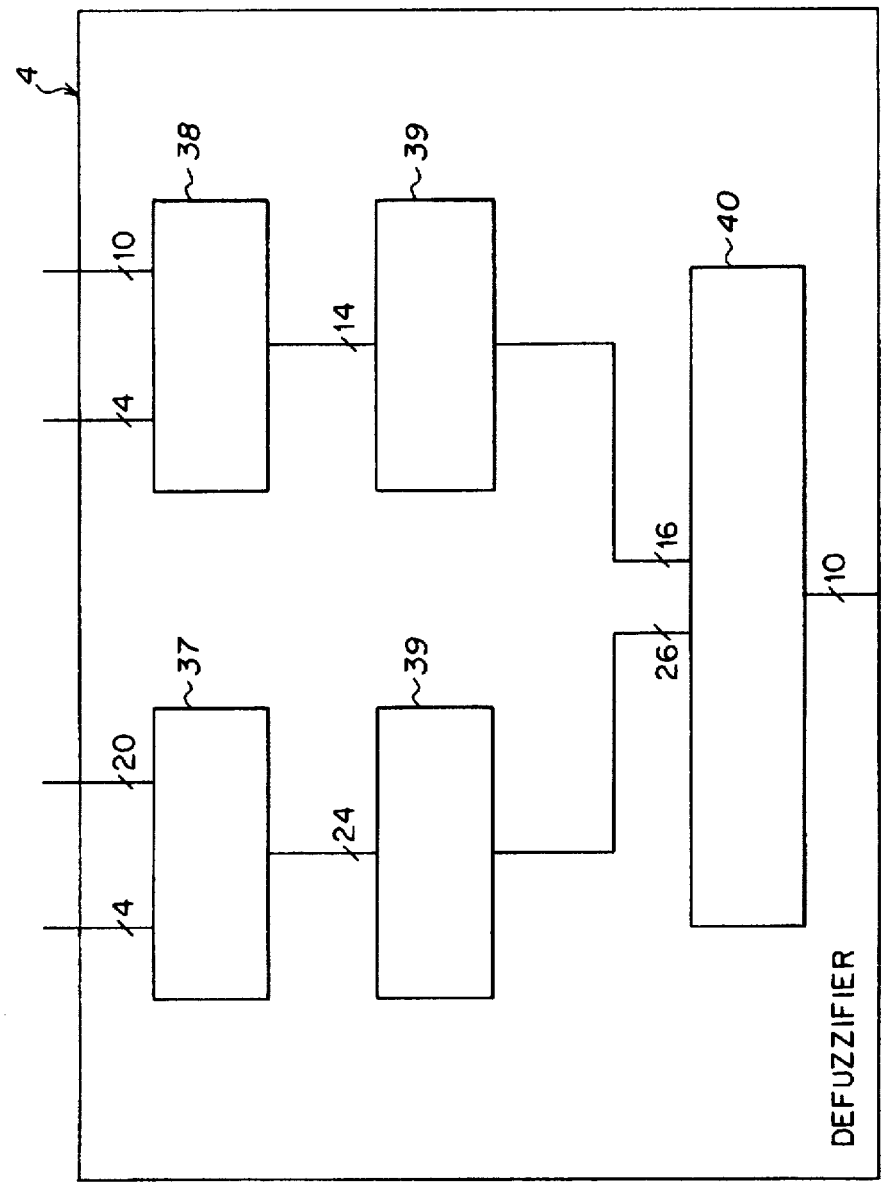
FIG. 5 shows diagramatically an output section of the architecture in FIG. 2.

The description of the controller 1 architecture will now be completed with reference to FIG. 5, which illustrates diagramatically the output and converting section 4.

In that section, the membership functions are combined according to the computational model of the fuzzy logic, to output the control signals following appropriate conversion.

Thus, the membership functions must be transformed into punctual representations in the definition domain pertaining to them.

To that aim, frequent use is made of various algorithms, known from the relevant literature, of which that of the so-called center of gravity is used most often.

With this method, the output from the controller 1 is given substantially by the center of gravity associated with a function yielded by the fuzzy rule processing.

Specifically, that function is obtained from the sum of the individual consequential membership functions, as modified according to the MAX-DOT technique and the weight θ of the inference rules where they appear.

With this assumption, the center of gravity of the resultant function from the fuzzy computation can be obtained, in an equivalent manner, from the centers of gravity associated with the individual membership functions that originated it.

Such partial centers of gravity are called "centroids", and the computation method just described is referred to as the method of the centroids, well known from the pertinent literature.

Figure 12:
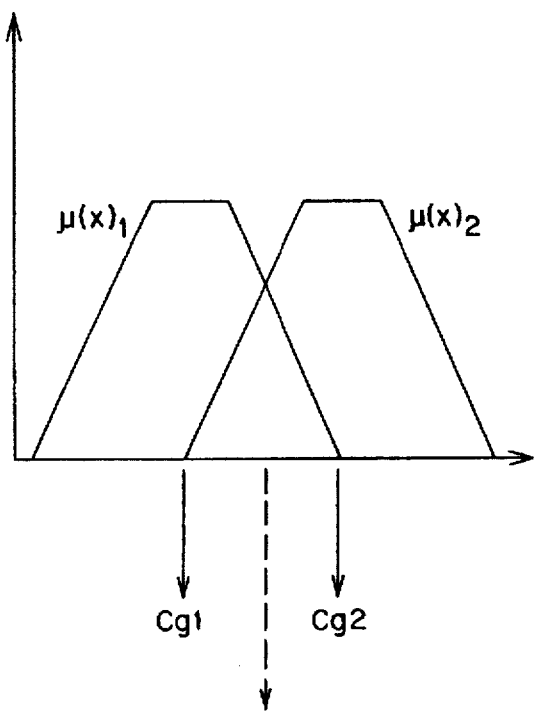
FIGS. 12 and 13 are respective graphs of logic operations performed in the controller of this invention.
Figure 13:
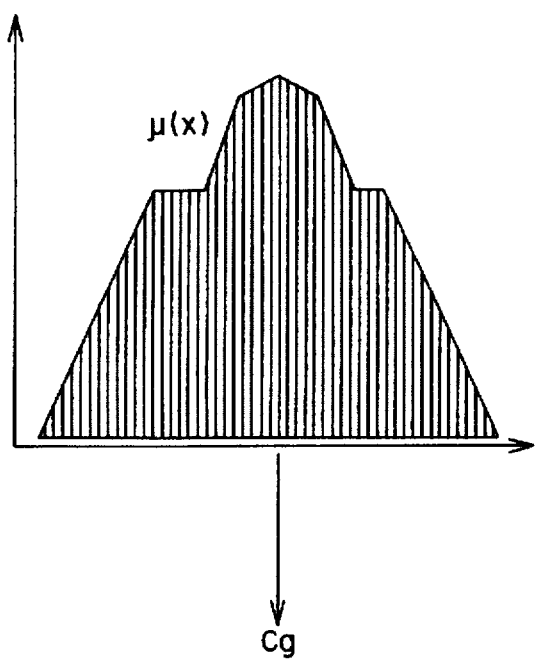

Represented graphically in FIGS. 12 and 13 are, on the one side, two membership functions, $\mu1(x)$ and $\mu2(x)$, with their respective centroids, Cg1 and Cg2, and on the other side, a function, $\mu(x)=\mu1(x)+\mu2(x)$, having a center of gravity, Cg, which is calculated from the above centroids.

By generalization of this procedure, the equation for calculating the center of gravity Cg using the MAX-DOT inference method can be arrived at.

This equation is the following:

$$Cg = \Sigma_i \theta_i A_i * X_{gi} / \Sigma_i \theta_i A_i$$

where, i varies from 1 to n, and θi is the weight applied to the i-th consequential membership function affected by the summation, Ai is the area of a given outgoing membership function, and Xgi is the center of gravity of that function.

Shown in FIG. 5 is the architecture of the defuzzifier 4 which implements said equation.

This architecture comprises two multipliers 37, 38 in parallel, each having an input connected, through the interfacing block 21, to the selector 19 from which the weight values θi originate, and an input connected to the memory block 22 that supplies the information about the consequent membership functions employed to carry out the defuzzifying process.

The multipliers 37, 38 simultaneously perform the multiplications which appear in the numerator and the denominator of the center of gravity equation.

The results of such multiplications are then passed to two adders 39, also connected in parallel, each adder having an input connected to the output of one multiplier.

Said adders simultaneously perform the two summations which appear in the numerator and the denominator of the equation.

The output of each adder corresponds to an input of a divider 40 which is supplied, at one time, the values of the summations in the numerator and the denominator of the equation.

A control signal is then output from the divider 40 whereby the controller 1 will drive the external apparatus.

This control signal will be expressed by a number of bits equal to the difference between the number of bits representing the numerator term and the number of bits representing the denominator term.

In the present instance, the number of bits in the numerator term would be 20, and the number of bits in the denominator term would be 10, so that the divider output is expressed by 10 bits.

The controller architecture of this invention does solve the technical problem, and distinguishes itself from prior solutions in that it greatly simplifies the computational work involved in the inference operations.

In addition, the particular memory setup ensures significantly improved overall performance, even in terms of magnitudes, over other embodiments.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. An input section of an electronic controller operated in a fuzzy logic manner whereby membership functions ($\mu(x)$) of logic variables are subjected to inference operations which are configured as a set of (IF-THEN) rules, each having at least one fore (IF) preposition and at least one consequent (THEN) implication, and being of a type which comprises an input section, a central control unit connected to said input section, and an output section connected to said central unit, said input section comprising:

at least one conversion block, connected between an input terminal of the input section and the central control unit for converting an input to membership function data, said conversion block including at least one memory block for storing information related to fore (IF) prepositions of the set of (IF-THEN) rules and at least one address decoder block for accessing data in said first and second storage areas; wherein the memory block includes:

a first storage area containing data representing a set of membership functions of logic variables tied to the (IF) prepositions of the set of (IF-THEN) rules, and a second storage area containing data associating each logic variable with a corresponding one of the membership functions in said set and at least one offset value; and wherein the at least one address decoder block includes:

at least one multiplexer having first, second, and third input terminals, each connected to at least a first output terminal of a shift register;

at least one subtractor having at least a first input terminal connected to at least one output terminal of the multiplexer, and at least a second input terminal connected to said input terminal of the input section;

at least one divider having at least one input terminal connected to at least one output terminal of the subtractor, and at least a first output terminal connected to at least a second input terminal of the shift register; and at least one adder having at least a first input terminal connected to at least a second output terminal of the divider, at least a second input terminal connected to at least one output terminal of the shift register, and at least one output terminal coupled to the first storage area.

2. An input section according to claim 1, wherein the at least one address decoder block is connected to said input terminal of the input section.

3. An input section of an electronic controller operated in a fuzzy logic manner whereby membership functions ($\mu(x)$) of logic variables are subjected to inference operations which are configured as a set of (IF-THEN) rules, each having at least one fore (IF) preposition and at least one consequent (THEN) implication, and being of a type which comprises an input section, a central control unit connected to said input section, and an output section connected to said central unit, said input section comprising:

at least one conversion block, connected between an input terminal of the input section and the central control unit for converting an input to membership function data, said conversion block including at least one memory block for storing information related to fore (IF) prepositions of the set of (IF-THEN) rules, a shift register connected to said memory block, and at least one enable block; wherein the memory block includes:

a first storage area containing data representing a set of membership functions of logic variables tied to the (IF) prepositions of the set of (IF-THEN) rules, and a second storage area containing data associating each logic variable with a corresponding one of the membership functions in said set and at least one offset value; and wherein said at least one enable block includes:

at least first and second comparators in parallel, each having at least a first input terminal connected to at least a second output terminal of the shift register, and at least a second input terminal connected to said input terminal of the input section; and at least one logic AND gate having at least a first input terminal connected to at least one output terminal of the first comparator, at least a second input terminal connected to at least one output terminal of the second comparator, and at least one output terminal connected to at least one input terminal of at least one address decoder block.

4. An input section according to claim 3, wherein the at least one address decoder block is connected to said input terminal of the input section.

5. A method for generating a membership function value from a logic variable value comprising the steps of:

storing data in a first memory defining membership function shapes; storing data in a second memory associating logic variables to one of said membership function shapes in said first memory and to at least one offset value;

retrieving first data from said second memory for a logic variable associated with said logic variable value;

retrieving second data from said first memory based upon said first data;

generating said membership function value based upon said logic variable value, said first data and said second data, wherein said step of generating the membership function value includes the steps of:

determining a first offset between said first data and said second data;

determining a second offset between said logic variable and said first data;

combining said first offset and said second offset to determine an address location; and accessing a membership function value in said first memory at said address location.

* * * * *